US012595768B2

(12) United States Patent
Stickling et al.

(10) Patent No.: US 12,595,768 B2
(45) Date of Patent: **\*Apr. 7, 2026**

(54) METHOD AND SYSTEM FOR CONFIGURING OPERATION OF AN ENGINE

(71) Applicant: PRATT & WHITNEY CANADA CORP., Longueuil (CA)

(72) Inventors: Bjorn Stickling, Mississauga (CA); Jonathan Miller, Natick, MA (US); James Jarvo, Saint-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 213 days.

This patent is subject to a terminal disclaimer.

(21) Appl. No.: 18/197,353

(22) Filed: May 15, 2023

(65) Prior Publication Data

US 2023/0304449 A1      Sep. 28, 2023

Related U.S. Application Data

(62) Division of application No. 16/591,295, filed on Oct. 2, 2019, now Pat. No. 11,686,257.

(51) Int. Cl.
| | |
|---|---|
| *F02C 9/28* | (2006.01) |
| *F02C 9/54* | (2006.01) |
| *G05B 15/02* | (2006.01) |
| *G06K 7/14* | (2006.01) |
| *G06K 7/10* | (2006.01) |

(52) U.S. Cl.
CPC ................. *F02C 9/28* (2013.01); *F02C 9/54* (2013.01); *G05B 15/02* (2013.01); *G06K*

*7/1417* (2013.01); *F05D 2270/20* (2013.01); *G06K 2007/10504* (2013.01); *G06K 2007/10524* (2013.01)

(58) Field of Classification Search
CPC ...... F05D 2270/20; G06K 2007/10504; G06K 2007/10524
See application file for complete search history.

(56) References Cited

U.S. PATENT DOCUMENTS

| | | | |
|---|---|---|---|
| 8,886,858 | B2 | 11/2014 | Alsford et al. |
| 9,008,943 | B2 | 4/2015 | Lickfold |
| 2004/0056766 | A1 | 3/2004 | Butz |
| 2007/0114280 | A1 | 5/2007 | Coop |
| 2013/0190928 | A1 | 7/2013 | Beecroft |
| 2014/0244132 | A1 | 8/2014 | Meisels et al. |
| 2015/0308337 | A1 | 10/2015 | Marasco |
| 2018/0322714 | A1 | 11/2018 | Gennotte |

*Primary Examiner* — Scott J Walthour

(74) *Attorney, Agent, or Firm* — Norton Rose Fulbright Canada LLP

(57) ABSTRACT

Systems and methods for configuring operation of an engine are described herein. A computer-readable label associate with the engine is read by a mobile device to obtain label information having at least one trim value for the engine encoded therein. The at least one trim value is extracted from the label information on the mobile device. The at least one trim value is wirelessly transmitted from the mobile device to a data transmission unit of the engine. The data transmission unit is configured for instructing an electronic engine controller to trim the engine with the at least one trim value during operation of the engine.

11 Claims, 5 Drawing Sheets

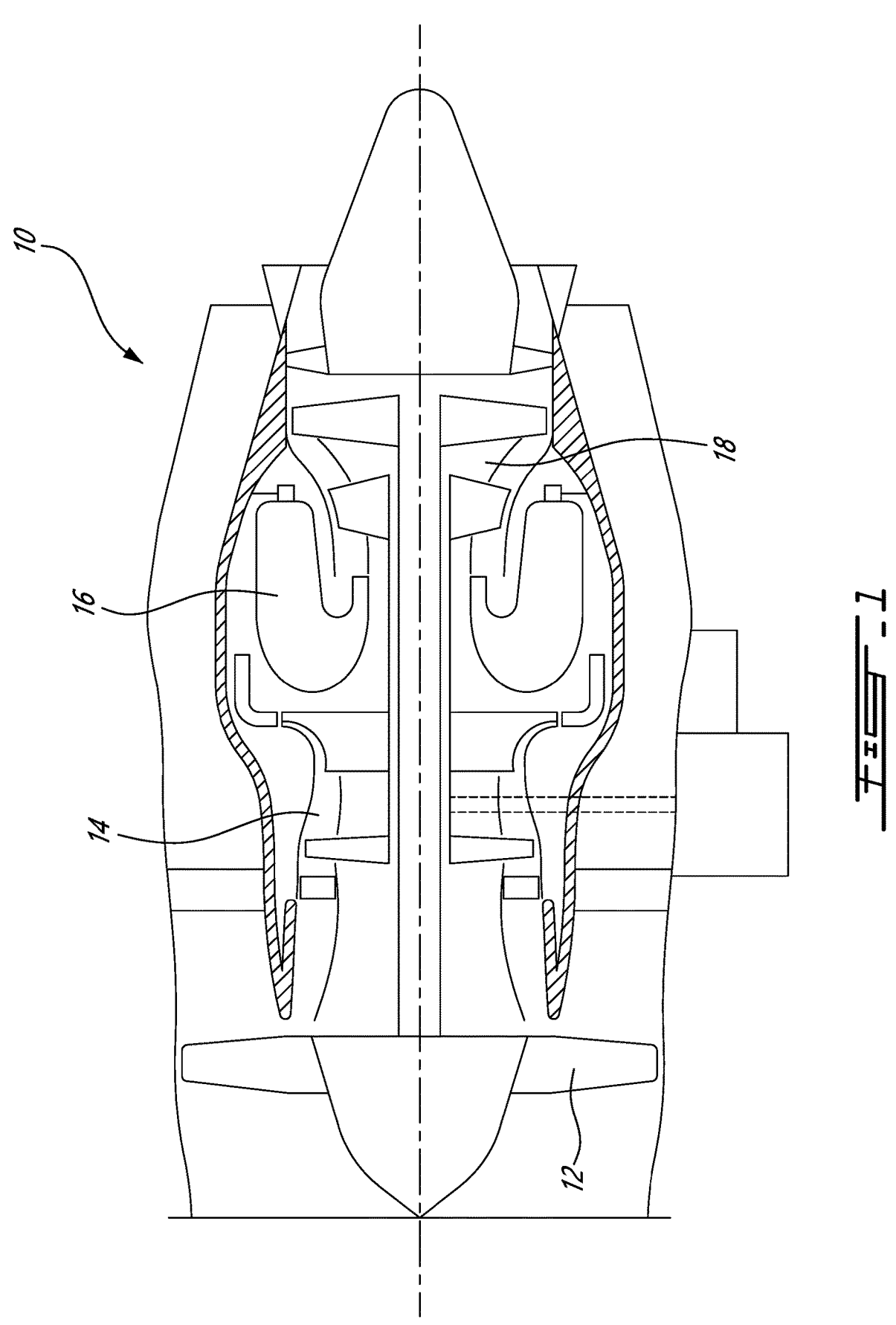
_FIG-1_

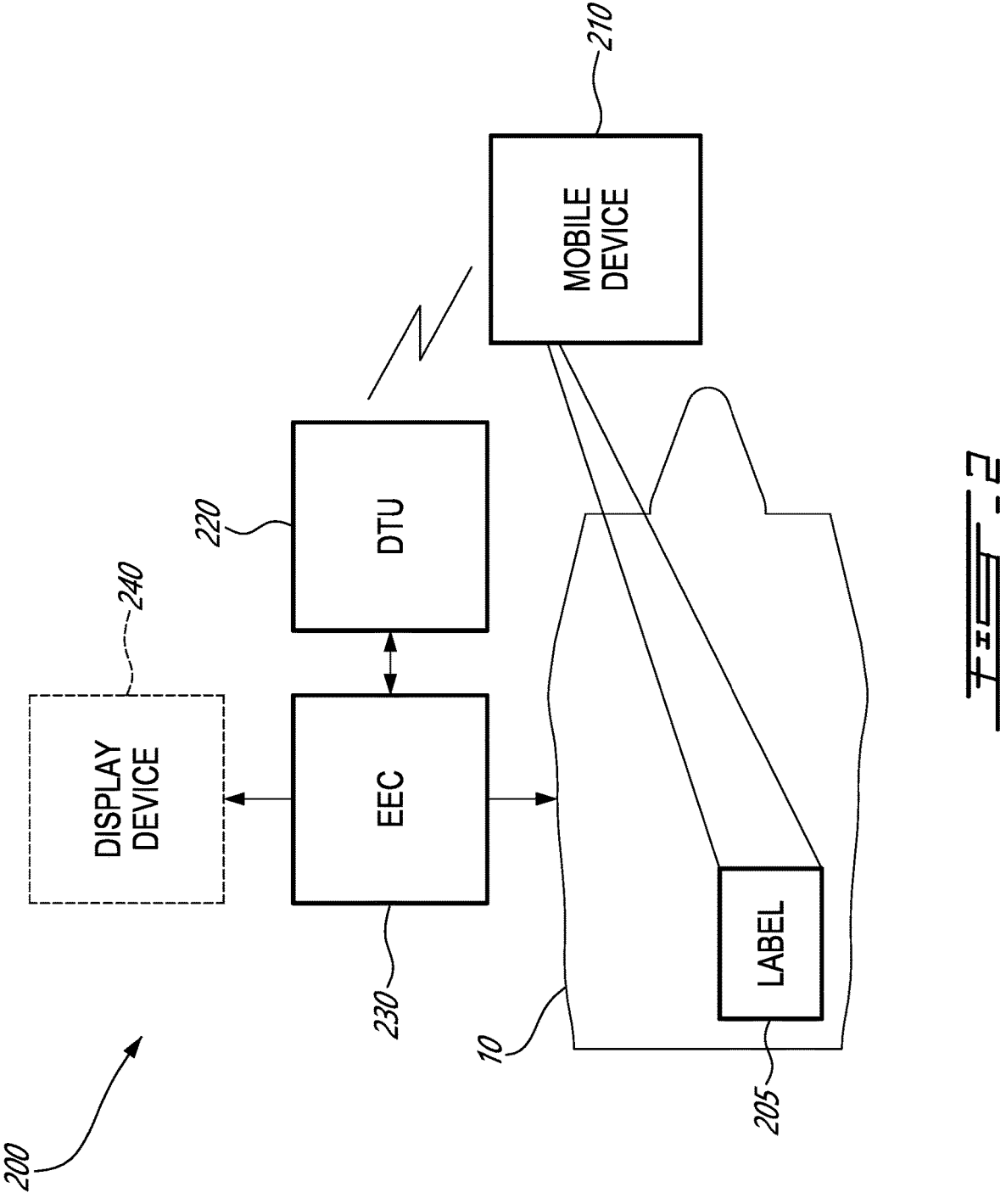
_FIG. 2_

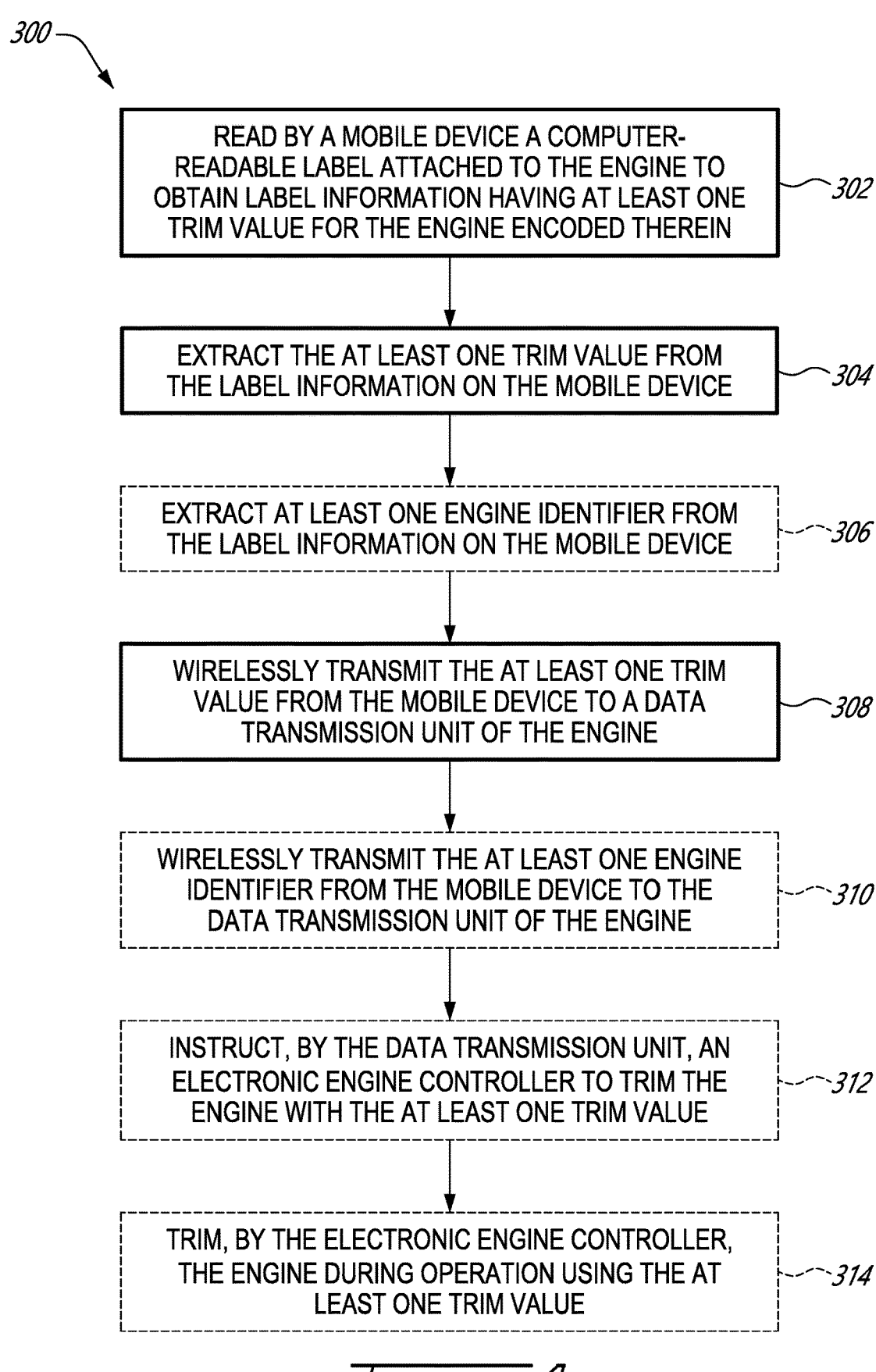

*300*

READ BY A MOBILE DEVICE A COMPUTER-READABLE LABEL ATTACHED TO THE ENGINE TO OBTAIN LABEL INFORMATION HAVING AT LEAST ONE TRIM VALUE FOR THE ENGINE ENCODED THEREIN — *302*

EXTRACT THE AT LEAST ONE TRIM VALUE FROM THE LABEL INFORMATION ON THE MOBILE DEVICE — *304*

EXTRACT AT LEAST ONE ENGINE IDENTIFIER FROM THE LABEL INFORMATION ON THE MOBILE DEVICE — *306*

WIRELESSLY TRANSMIT THE AT LEAST ONE TRIM VALUE FROM THE MOBILE DEVICE TO A DATA TRANSMISSION UNIT OF THE ENGINE — *308*

WIRELESSLY TRANSMIT THE AT LEAST ONE ENGINE IDENTIFIER FROM THE MOBILE DEVICE TO THE DATA TRANSMISSION UNIT OF THE ENGINE — *310*

INSTRUCT, BY THE DATA TRANSMISSION UNIT, AN ELECTRONIC ENGINE CONTROLLER TO TRIM THE ENGINE WITH THE AT LEAST ONE TRIM VALUE — *312*

TRIM, BY THE ELECTRONIC ENGINE CONTROLLER, THE ENGINE DURING OPERATION USING THE AT LEAST ONE TRIM VALUE — *314*

FIG. 4

OUTPUTS

400

414

MEMORY

INSTRUCTIONS

PROCESSING UNIT

412

416

INPUTS

METHOD AND SYSTEM FOR CONFIGURING OPERATION OF AN ENGINE

CROSS REFERENCE TO RELATED APPLICATION

This application is a division of U.S. patent application Ser. No. 16/591,295 filed on Oct. 2, 2019, the entire contents of which are hereby incorporated by reference.

TECHNICAL FIELD

The present disclosure relates generally to engines, and, more particularly, to methods and systems for configuring operation of an engine.

BACKGROUND OF THE ART

Aircraft engines and their associated electronic engine controllers may be separate from each other and inter-changed during the lifetime operation of the aircraft. When an engine or an engine controller is interchanged, the engine controller may need to be configured with information specific to the engine that it is to control. A technician or other suitable person may manually program the engine controller with the appropriate information. However, this manual programming is susceptible to human error.

As such, there is room for improvement.

SUMMARY

In one aspect, there is provided a method for configuring operation of an engine. The method comprises: reading by a mobile device a computer-readable label associated with the engine to obtain label information having at least one trim value for the engine encoded therein; extracting the at least one trim value from the label information on the mobile device; wirelessly transmitting the at least one trim value from the mobile device to a data transmission unit of the engine, the data transmission unit configured for instructing an electronic engine controller to trim the engine with the at least one trim value during operation of the engine.

In one aspect, there is provided a mobile device for configuring operation of an engine. The mobile device comprises a processing unit and a non-transitory memory communicatively coupled to the processing unit. The non-transitory memory comprising computer-readable program instructions executable by the processing unit for: reading a computer-readable label associated with the engine to obtain label information having at least one trim value for the engine encoded therein; extracting the at least one trim value from the label information; and wirelessly transmitting the at least one trim value to a data transmission unit of the engine, the data transmission unit configured for instructing an electronic engine controller to trim the engine with the at least one trim value during operation of the engine.

In one aspect, there is provided a method for configuring operation of an engine. The method comprises: reading by a mobile device a computer-readable label associated with the engine to obtain label information having at least one trim value for the engine encoded therein; extracting the at least one trim value from the label information on the mobile device; wirelessly transmitting the at least one trim value from the mobile device to a data transmission unit of the engine; instructing, by the data transmission unit, an electronic engine controller to trim the engine with the at least one trim value during operation of the engine; and trimming, by the electronic engine controller, the engine during operation using the at least one trim value.

In one aspect, there is provided a system for configuring operation of an engine. The system comprises: a mobile device configured for: reading a computer-readable label associated with the engine to obtain label information having at least one trim value for the engine encoded therein; extracting the at least one trim value from the label information; and wirelessly transmitting the at least one trim value to a data transmission unit of the engine; the data transmission unit configured for instructing an electronic engine controller to trim the engine with the at least one trim value during operation of the engine; and the electronic engine controller configured to trim the engine during operation using at least one trim value.

DESCRIPTION OF THE DRAWINGS

Reference is now made to the accompanying figures in which:

FIG. 1 is a schematic cross-sectional view of an example gas turbine engine, in accordance with one or more embodiments;

FIG. 2 is a schematic of an example system for configuring operation of an engine, in accordance with one or more embodiments;

FIG. 4 is a flowchart illustrating an example method for configuring operation of an engine, in accordance with one or more embodiments.

It will be noted that throughout the appended drawings, like features are identified by like reference numerals.

DETAILED DESCRIPTION

Figure 3:
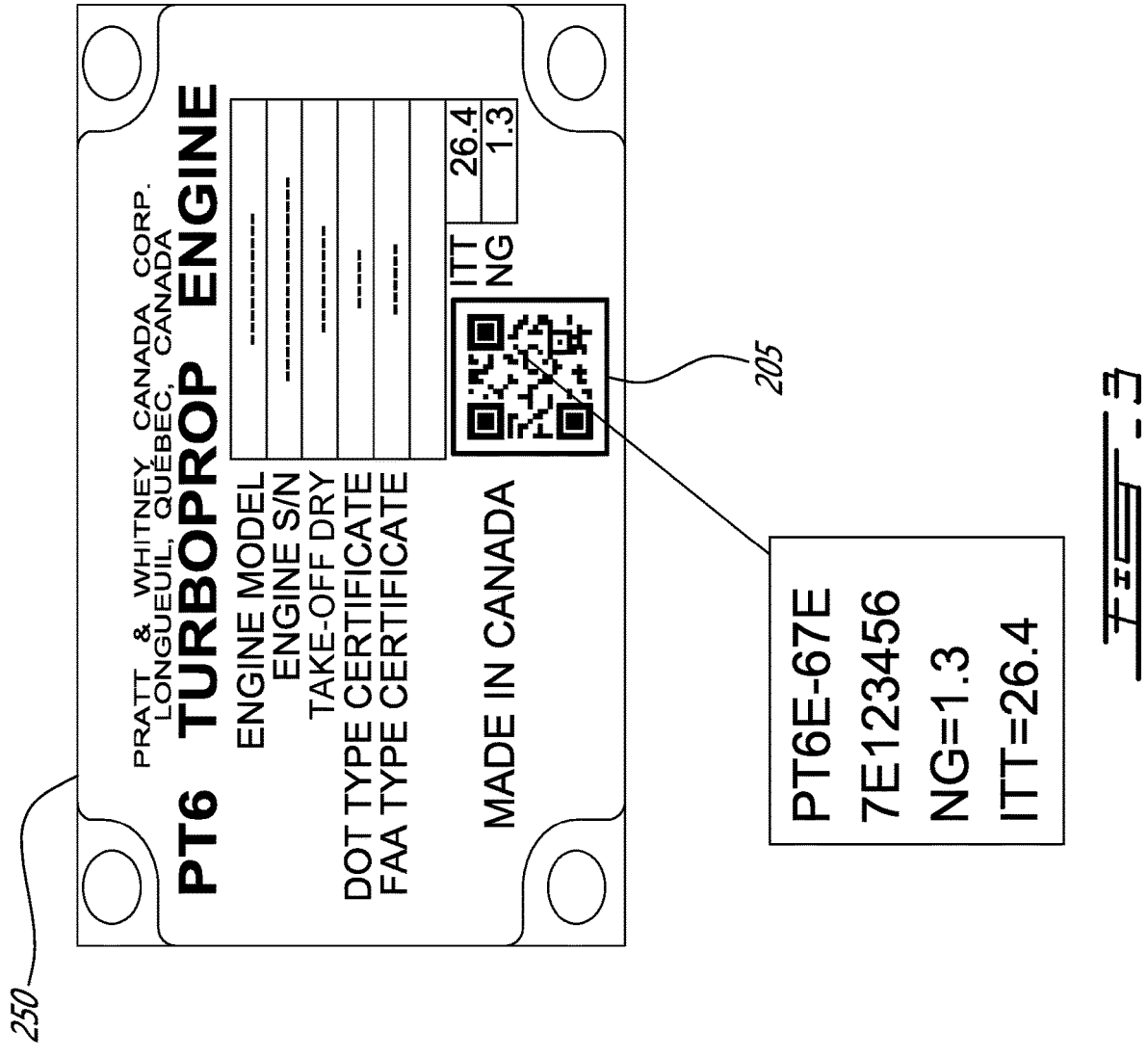
FIG. 3 is an example data plate with a computer-readable label, in accordance with one or more embodiments.
Figure 5:
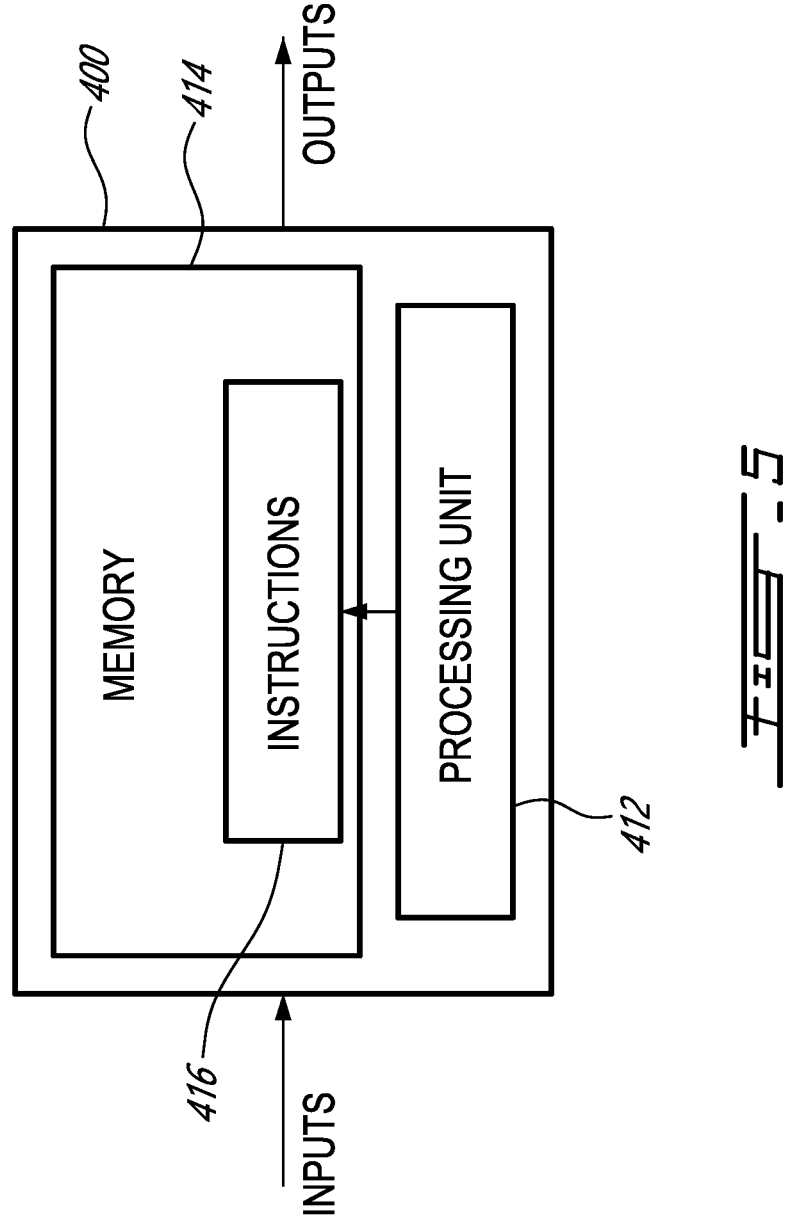
FIG. 5 is an example computing device for implementing a method and/or system for configuring operation of an engine, in accordance with one or more embodiments.

FIG. 1 illustrates a gas turbine engine 10 that the operation thereof may be configured using the systems and methods described herein. The engine 10 generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Note that while engine 10 is a turbofan engine, the systems and methods for configuring an engine may be applicable to turboprop engines, turboshaft engines, other types of aircraft engines and any other suitable types of engines (e.g., industrial engines, automotive engines, etc.). Other examples of engines comprise auxiliary power units (APUs), rotary engines, and hybrid electric propulsion engines.

With reference to FIG. 2, a system 200 for configuring operation of an engine, such as the engine 10, is illustrated. While FIG. 2 is described herein with reference to the engine 10, this is for example purposes only and the system 200 may be used to configure any suitable engine. In the example of FIG. 2, the system 200 comprises a mobile device 210, a data transmission unit (DTU) 220 and an electronic engine controller (EEC) 230. Optionally, the system 200 may comprise a display device 240. The system 200 may vary depending on practical implementations.

In FIG. 2, the engine 10 may be a replacement engine and/or the EEC 230 may be a replacement EEC. For example, an aircraft having an engine and an EEC may require the engine and/or the EEC be replaced, for example, as part of a maintenance operation. Accordingly, in this example, the EEC 230 would need to be programmed with the necessary information in order to control the operation of the engine 10.

The engine 10 may have a computer-readable label 205 attached thereto. The label 205 comprises label information that has encoded therein information regarding the engine 10. In particular, the label information has encoded therein at least one trim value for the engine 10. The label information may further have encoded therein one or more engine identifiers (e.g., an engine serial number, an engine model number, an engine build number and/or the like). The label information may have encoded therein any other suitable information.

Each trim value corresponds to a value that the EEC 230 uses for controlling the operation of the engine 10. Accordingly, the trim value(s) may be referred to as engine trim value(s). The trim value(s) may be used by the EEC 230 for adjusting the fuel flow control to the engine 10 during operation of the engine 10, More specifically, fuel flow to the engine 10 is controlled by the EEC 230 and a fuel flow delivery schedule may be used by the EEC 230 to control fuel flow. The fuel flow delivery schedule may be adjusted by the EEC 230 based on the trim value(s). The trim value(s) may comprise one or more of: an interstage turbine temperature (ITT) trim value, an engine rotational speed (NG) trim value, and any other suitable trim value(s). The NG trim value may be an low pressure compressor speed (N1) trim value. The trim value(s) typically vary from engine to engine and are typically obtained during a testing phase. For example, the engine 10 may be operated under a test environment (e.g., in a production test cell) to obtain the trim value(s) for that engine 10. For example, the ITT and NG trim values may be computed during a final engine pass off test prior to shipment of the engine 10. The trim value(s) may be determined in order to fine tune the engine performance to compensate for mechanical variations in the gas path of the engine 10. The trim value(s) may then be encoded into label information for the label 205, which may then be attached to the engine 10, The engine 10 may then be delivered and coupled to the aircraft. The label 205 may be associated with the engine 10 in any suitable manner. For example, the engine 10 may be delivered with label 205 being provided separate from the engine 10.

The NG trim value may be used by the EEC 230 to adjust the engine rotational speed, such as the low pressure compressor speed. For example, the N1 trim value may be used to compensate at the EEC 230 the N1 in order for the engine 10 to provide thrust at a predetermined thrust level for a selected reference N1. The N1 trim may be defined as a class value from 0 to 7 with each class step representing 0.47% N1. The ITT trim value may be used by the EEC 230 to adjust the temperature of the engine. For example, the ITT trim value may be used to compensate a T4.5 temperature to ensure a correct T4.5 to T4.0 temperature relationship. The T4.5 temperature is the temperature between the two power turbines that the EEC 230 uses to control fuel input and the T4.0 temperature is the temperature at the high pressure exit of the combustion chamber where the hot gases exit. The types of trim values and the possible ranges of trim values may vary depending on the type of engine.

The label 205 may be any suitable computer-readable label. The label 205 may be a one-dimensional linear barcode, for example, such as provided by International Standard ISO/IEC 15417, 15420, 16388, or 16390. The label

205 may be a two-dimensional matrix code, for example, such as provided by International Standard ISO/IEC 24778, 16022, or 18004. In some embodiments, label 205 is a Quick Response (QR) code or a data matrix code.

The mobile device 210 may be any suitable portable computing device, such as a mobile phone, a tablet, a laptop computer, or the like. The mobile device 210 is configured to read the label 205 to obtain the label information and to extract the trim value(s) from the label information. The mobile device 210 may further extract the engine identifier(s) from the label information. Any suitable optical scanner of the mobile device 210 or any suitable optical scanner connected to the mobile device 210 may be used to obtain the label information. For example, the mobile device 210 may comprise a camera for capturing one or more images of the label 205 to obtain the label information. The mobile device 210 may be able to process the image(s) of the label information to extract the trim value(s) and any engine identifier(s). The mobile device is configured to wirelessly transmit the trim value(s) and, optionally, the engine identifier(s), to the DTU 220. The mobile device 210 transmits the trim value(s) to the DTU 220 for instructing the DTU 220 to program the trim value(s) into the EEC 230. The trim value(s) are programmed into the EEC 230 in order for the EEC 230 to trim the engine 10 with the trim value(s) stored within the EEC 230 during operation. Accordingly, the aforementioned instruction by the mobile device 210 to the DTU 220 is for configuring operation of the engine 10. The mobile device 210 may transmits the engine identifier(s) to the DTU 220 for instructing the DTU 220 to program the engine identifier(s) into the EEC 230. For example, the mobile device 210 may instruct the DTU 220 to program the engine serial number into the EEC 230 when the EEC 230 or the engine 10 is replaced.

The mobile device 210 may communicate with the DTU 220 directly or via one or more networks. The mobile device 210 may communicate with the DTU 220 directly by N1-Fi, Bluetooth, ZigBee, or by any other suitable wireless communication protocol, or may communicate with the DTU 220 over a Wi-Fi network, over a cellular network, over the Internet, or over any other suitable communication network. The mobile device may comprise antenna(s), transmitter(s), receiver(s), transceiver(s), processor(s), and/or any other suitable components for wireless communication.

The DTU 220 may be any suitable communication system that is able to communicate with the mobile device 210 and the EEC 230. The DTU 220 is configured to receive the trim value(s) and transmit the trim value(s) to the EEC 230 for being programmed therein. In other words, the DTU 220 is configured for instructing the EEC 230 to trim the engine 10 with the trim value(s). The DTU 220 may be configured to receive the engine identifier(s). The DTU 220 may be configured to transmit the engine identifier(s) to the EEC 230. In some embodiments, the DTU 220 receives the engine identifier(s) and transmits the engine identifier(s) to the EEC 230 when the engine identifier(s) at the DTU 220 are different from the engine identifier(s) at the EEC 230 (e.g., when the engine serial numbers are different). In some embodiments, the DTU 220 may verify that one or more of the engine identifiers corresponds to the engine 10 that the EEC 230 is connected thereto prior to transmitting the trim value(s) to the EEC 230. For example, the EEC 230 may be pre-programmed with the serial number of the engine 10 that it is to control prior to installation on the aircraft. The DTU 220 may obtain the serial number of the engine 10 from the EEC 230 and compare it to the serial number provided by the mobile device. If the serial number matches, then the DTU 220 may instruct the EEC 230 to program the trim value(s) therein. The DTU 220 may transmit the trim value(s) and engine identifier(s) to the EEC 230.

The DTU 220 is coupled to the EEC 230 and configured for wired communication with the EEC 230. The DTU 220 may communicate with the EEC 230 using a serial bus protocol over at least one wire connecting the DTU 220 to the EEC 230. Alternatively, the DTU 220 may communicate with the EEC 230 using a parallel bus protocol over a plurality of wires connecting the DTU 220 to the EEC 230. The DTU 220 may be referred to as a "data collection and transmission unit". The DTU 220 may be configured for any other suitable functionality, in addition to receiving and forwarding the trim value(s) and/or engine identifier(s). In alternative embodiments, the DTU 220 may be configured for wireless communication with the EEC 230.

The EEC 230 is configured to communicate with the DTU 220. The EEC 230 receives and stores the trim value(s). The trim value(s) are stored in any suitable memory or storage device of the EEC 230. The trim value(s) are stored for the later purpose of using the trim value(s) during operation of the engine 10. In other words, the trim value(s) are stored for the purpose of configuring the operation of the engine 10. During operation of the engine 10, the trim value(s) may be obtained from memory or storage and used to trim the engine. Trimming the engine refers to adjusting the operation of the engine with the trim value(s).

The EEC 230 may be configured to receive and store the engine identifier(s). The engine identifier(s) are stored in any suitable memory or storage device of the EEC 230. In some embodiments, the EEC 230 may verify that one or more of the engine identifiers corresponds to the engine 10 that the EEC 230 is connected thereto prior to storing the trim value(s). For example, the EEC 230 may be pre-programmed with the serial number of the engine 10 that it is to control prior to installation on the aircraft. The EEC 230 may compare the stored serial number to the serial number provided by the DTU 220. If the serial numbers match, then the EEC 230 may program the trim value(s) therein.

The EEC 230 is configured for controlling operation of the engine 10. The EEC 230 controls the operation of the engine 10 based on various input parameters, such as current flight conditions, throttle lever position, engine temperatures, engine pressures, engine speeds, and/or any other suitable parameter(s). More specifically, engine operating parameters, such as fuel flow, stator vane position, air bleed valve position, and/or others, are computed at least from the input parameters and applied as appropriate during operation of the engine 10. Furthermore, during operation of the engine the EEC 230 trims the engine 10 with the trim value(s). For instance, a given engine operating parameter is determined based on the trim value(s) and one or more of the input parameters.

In some embodiments, the EEC 230 may be mounted on an airframe of an aircraft having the engine 10. Alternatively, in some embodiments, the EEC 230 may be mounted on the engine 10.

The display 240 may be any suitable display device, for example, such as a multi-function display, a cathode ray tube display screen, a light-emitting diode display screen, a liquid crystal display screen, a touch screen, and/or any other suitable display device. The EEC 230 may provide the trim values that are programmed therein to the display 240 for display thereon. The EEC 230 may provide the trim values to the display 240 via an aircraft and/or engine computer. The trim values may be displayed on a maintenance page of the display 122. Upon confirming the values shown on the display 240 correspond with the values of the label 205, the aircraft could be signed back into service by the appropriate personnel.

With reference to FIG. 3, an example of a data plate 250 comprising the label 205 is shown. The data plate 250 may be attached to the engine 10. Accordingly, the label 205 may be attached to the engine 10 by use of the data plate 250. In this example, the label 205 has encoded therein the engine serial number, the engine model number, an ITT trim value and an NG trim value. The data plate 250 also comprises a human-readable version of the trim values and engine identifiers encoded in the label 205.

With reference to FIG. 4 there is shown a flowchart illustrating an example method 300 for configuring operation of an engine, such as the engine 10 of FIG. 1. While the method 300 is described herein with reference to the engine 10 of FIG. 1, this is for example purposes only. The method 300 may be applied to any suitable engine. At step 302, a computer-readable label 205 associated with the engine 10 is read by a mobile device 210 to obtain label information having at least one trim value for the engine 10 encoded therein. At step 304, at least one trim value is extracted from the label information on the mobile device 210. At step 306, in some embodiments, at least one engine identifier is extracted from the label information on the mobile device 210. At step 308, the at least one trim value is wirelessly transmitted from the mobile device 210 to a DTU 220 of the engine 10. At step 310, in some embodiments, the at least one engine identifier is wirelessly transmitted from the mobile device 210 to the DTU 220. The DTU 220 is configured for instructing an EEC 230 to trim the engine 10 with the at least on trim value during operation of the engine 10.

At step 312, in some embodiments of the method 300, the DTU 220 instructs an EEC 230 to trim the engine 10 with the at least one trim value during operation of the engine 10. Accordingly, the DTU 220 provides the at least one trim value to the EEC 230 and the EEC 230 stores the at least one trim value. The DTU 220 may also provide the engine identifier(s) to the EEC 230 along with the trim value(s), and the EEC 230 may store the engine identifier(s). At step 314, in some embodiments of the method 300, the EEC 230, trims the engine 10 during operation using the at least one trim value.

In some embodiments, steps 304 and 306 may be combined and/or steps 308 and 310 may be combined. The order of the steps of the method 300 may vary. For example, step 306 may be performed prior to step 304 and/or step 310 may be performed prior to step 308.

The method 300 and/or system 200 may further comprise displaying the trim value(s) and/or the engine identifier(s) on a display of the mobile device 210 prior to transmission to the DTU 220. For example, the trim value(s) and/or the engine identifier(s) may be displayed and the user of the mobile device 210 may confirm that the displayed values correspond with the human readable values on the data plate 250. The user may then request via the mobile device 210 that the trim value(s) and/or the engine identifier(s) are transmitted to the DTU 220 with instructions that they are to programed into the EEC 230.

In alternative embodiments, the DTU 220 may be omitted and the mobile device 210 may wirelessly communicate with the EEC 230 in order to provide the EEC 230 with the trim value(s) and/or engine identifier(s) for being programmed into the EEC 230.

The mobile device 210 may be programmed to run an application for reading the label 205 to obtain the label information, extracting the trim value(s) and/or engine identifier(s) from the label information and transmitting the trim value(s) and/or engine identifier(s) to the DTU 220. The application may show then extracted trim value(s) and/or engine identifier(s) on the display of the mobile device 210, The application may allow the user to request that the trim value(s) and/or engine identifier(s) are transmitted to the DTU 220, The mobile device 210 may receive confirmation from the DTU 220 that the DTU 220 received the trim value(s) and/or engine identifier(s), and/or that the EEC 230 has been programmed with the trim value(s) and/or engine identifier(s). Such confirmation(s) may be displayed on the display of the mobile device 210 via the application.

With reference to FIG. 4, the method 300 may be implemented using at least one computing device 400, The mobile device 210, the DTU 220 and/or the EEC 230 may each be implemented by a respective computing device 400. The computing device 400 comprises a processing unit 412 and a memory 414 which has stored therein computer-executable instructions 416. Accordingly, each of the mobile device 210, the DTU 220 and/or the EEC 230 may comprise a processing unit 412 and a memory 414. The processing unit 412 may comprise any suitable devices such that instructions 416, when executed by the computing device 400 or other programmable apparatus, may cause at least in part the functions/acts/steps of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. In some embodiments, the computing device 400 can be implemented as part of a full-authority digital engine controls (FADEC) or other similar device, including an electronic engine controller (EEC), an engine control unit (ECU), and the like.

The methods and systems for configuring operation of an engine described herein may be implemented in a high level procedural or object oriented programming or scripting language, or a combination thereof, to communicate with or assist in the operation of a computer system, for example the computing device 400. Alternatively, the methods and systems for configuring operation of an engine may be implemented in assembly or machine language. The language may be a compiled or interpreted language. Program code for implementing the methods and systems for configuring operation of an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for configuring operation of an engine may also be considered to be implemented by way of a non-transitory computer-readable storage medium having a computer program stored thereon. The computer program may comprise computer-readable instructions which cause a computer, or in some embodiments the processing unit 412 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for configuring operation of an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A system comprising:

an engine;

a computer-readable label attached to the engine, the computer-readable label having information thereon, at least one trim value for the engine being encoded in the information;

an electronic engine controller of the engine configured to control the engine and to trim the engine with the at least one trim value by adjusting an operation of the engine with the at least one trim value;

a data transmission unit of the engine in communication with the electronic engine controller and configured to instruct the electronic engine controller to trim the engine with the at least one trim value; and a mobile device in wireless communication with the data transmission unit of the engine, the mobile device including:

a processing unit; and a non-transitory memory communicatively coupled to the processing unit and comprising computer-readable program instructions executable by the processing unit to:

read the computer-readable label to obtain the at least one trim value for the engine encoded in the information on the computer-readable label;

extract the at least one trim value from the information; and wirelessly transmit the at least one trim value to the data transmission unit of the engine.

2. The system of claim 1, wherein the at least one trim value comprises an interstage turbine temperature trim value.

3. The system of claim 1, wherein the at least one trim value comprises an engine rotational speed trim value.

4. The system of claim 1, wherein the computer-readable label is a one-dimensional linear barcode.

5. The system of claim 1, wherein the computer-readable label is a two-dimensional matrix code.

6. The system of claim 1, wherein the computer-readable program instructions are further executable by the processing unit to extract at least one engine identifier from the information on the computer-readable label and wirelessly transmit the at least one engine identifier to the data transmission unit.

7. The system of claim 6, wherein the at least one engine identifier comprises an engine serial number.

8. The system of claim 6, wherein the at least one engine identifier comprises an engine model number.

9. The system of claim 6, wherein the electronic engine controller is configured to verify that the at least one engine identifier corresponds to the engine that the electronic engine controller is connected to prior to trimming the engine with the at least one trim value.

10. The system of claim 1, wherein the computer-readable label is provided on a data plate attached to the engine.

11. The system of claim 10, wherein the data plate includes a human-readable version of the at least one trim value.

* * * * *